United States Patent [19]
von Flotow et al.

[11] Patent Number: 6,078,673
[45] Date of Patent: Jun. 20, 2000

[54] APPARATUS AND METHOD FOR ACTIVE CONTROL OF SOUND TRANSMISSION THROUGH AIRCRAFT FUSELAGE WALLS

[75] Inventors: Andreas H. von Flotow; Mathieu Mercadal; Peter M. Tappert, all of Hood River, Oreg.

[73] Assignee: Hood Technology Corporation, Hood River, Oreg.

[21] Appl. No.: 08/943,403

[22] Filed: Oct. 3, 1997

[51] Int. Cl.[7] .................................................. A61F 11/06
[52] U.S. Cl. ........................................ 381/71.7; 381/71.4
[58] Field of Search ............................... 381/71.7, 71.11, 381/71.14, 71.4, 71.1

[56] References Cited

U.S. PATENT DOCUMENTS

| | | |
|---|---|---|
| 4,455,675 | 6/1984 | Bose et al. . |
| 4,527,282 | 7/1985 | Chaplin et al. . |
| 4,644,581 | 2/1987 | Sapieiewski . |
| 4,947,356 | 8/1990 | Elliott . |
| 5,024,288 | 6/1991 | Shepherd . |
| 5,498,127 | 3/1996 | Kraft . |
| 5,519,637 | 5/1996 | Mathur . |
| 5,627,891 | 5/1997 | Gagliardini . |
| 5,724,432 | 3/1998 | Bouvet et al. ........................... 381/71.7 |
| 5,848,169 | 12/1998 | Clark, Jr. et al. ....................... 381/71.7 |

OTHER PUBLICATIONS

Olson, Harry F., "Electronic Control of Noise, Vibration and Reverberation", *Journal of the Acoustical Society of America*, vol. 28, No. 5, Sep. 1956, pp. 966–972.

Grosveld, F.W., Shepherd, K.P., "Active Sound Attenuation Across a Double Wall Structure", *Journal of Aircraft*, vol. 31, No. 1, Jan.–Feb. 1994, pp. 223–227.

Olson, Harry F., and May, Everett G., "Electronic Sound Absorber", *The Journal of the Acoustical Society of America*, vol. 25, No. 6, Nov. 1953, pp. 1130–1136.

*Primary Examiner*—Ping Lee
*Attorney, Agent, or Firm*—Wolf, Greenfield & Sacks, P.C.

[57] ABSTRACT

In aircraft, much of the noise in the cabin is a result of pressure fluctuations on the exterior fuselage skin, which vibrates the skin and causes sound pressure waves to propagate through the trim panel cavity, exciting the trim panels, which radiate into the cabin. In the present invention, noise is reduced in the cabin of an aircraft by reducing the acoustical impedance of the trim panel cavity of the aircraft using an array of independent active sound absorbing acoustic cells. Acoustical drivers are mounted within the trim panel cavity of the aircraft. Each acoustical driver has at least one electroacoustical sensor mounted in its immediate vicinity. The sensor is connected to the driver to provide negative feedback, which has the effect of canceling noise in the vicinity of each cell. Since the effect of each cell is to absorb acoustical energy, the acoustical impedance of the trim panel cavity is reduced. Multiple sound absorbing acoustic cells in the trim panel cavity therefore decrease the acoustical impedance inside the trim panel cavity which in turn reduces the transmission of noise into the cabin.

6 Claims, 2 Drawing Sheets

APPARATUS AND METHOD FOR ACTIVE CONTROL OF SOUND TRANSMISSION THROUGH AIRCRAFT FUSELAGE WALLS

FIELD OF THE INVENTION

The present invention relates to devices and methods for reducing aircraft cabin noise with an array of active, independent sound absorbing acoustic cells in the trim panel cavity.

BACKGROUND OF THE INVENTION

Using a device consisting of an acoustical driver, electroacoustical sensor and negative feedback of the sensor output to the driver, acoustic noise can be reduced in the vicinity of the acoustical driver. Such a device is shown in "Electronic Control of Noise, Vibration and Reverberation," by H. F. Olson, *J. Acoust. Soc. Amer.*, Vol. 28, No. 5, pp. 966–972, September 1956. This reference describes a device consisting of a speaker, which converts an electrical signal into an acoustical output, a microphone, which converts sound pressure into an electrical signal, and an amplifier which feeds back the electrical signal of the microphone to the speaker in a negative fashion. The effect of the negative feedback of the microphone signal is to reduce the sound pressure at the microphone. This reference describes several potential applications, such as reducing sound in small enclosed cavities, headphones, and helmets, and in providing localized noise reduction, such as near a machine operator's head or near the head of a passenger of an airplane or automobile.

An approach to noise reduction in an airplane also is described in "Active Sound Attenuation Across a Double Wall Structure," in *Journal of Aircraft*, Vol 31, No. 1, January–February 1994, pp. 223–227, by F. W. Grosveld and K. P. Shepherd. This system also is described in U.S. Pat. No. 5,024,288. This reference describes a device in which the microphone is not placed in the vicinity of the acoustical driver. Rather, acoustic drivers are placed in what is known as the trim panel cavity of the aircraft. Error microphones are placed in the cabin. A feedforward approach is used to drive the acoustical drivers. This feedforward approach requires the error microphones to be in the cabin and also requires a coherent reference signal which may be impractical or unfeasible. This feedforward approach also tends to amplify noise at locations away from the error microphones.

SUMMARY OF THE INVENTION

In aircraft, much of the noise in the cabin is a result of pressure fluctuations on the exterior fuselage skin, which vibrate the skin and cause sound pressure waves to propagate through the trim panel cavity, exciting the trim panels, which radiate into the cabin. In the present invention, noise is reduced in the cabin of an aircraft by reducing the acoustical impedance of the trim panel cavity of the aircraft using an array of independent active sound absorbing acoustic cells.

Acoustical drivers are mounted within the trim panel cavity of the aircraft. Each acoustical driver has at least one electroacoustical sensor mounted in its vicinity. The sensor is connected to the driver to provide negative feedback, which has the effect of canceling noise in the vicinity of each cell. Since the effect of each cell is to null acoustical signals, the acoustical impedance of the trim panel cavity is reduced. Multiple sound absorbing acoustic cells in the trim panel cavity therefore decrease the acoustical impedance inside the trim panel cavity which in turn reduces trim panel vibration and thus the transmission of noise into the cabin.

Accordingly, one aspect of the present invention is a system for attenuating noise in a cabin of an aircraft. The aircraft has an interior wall defining the cabin, and an exterior fuselage defining a cavity between the fuselage and the interior wall. The system includes a plurality of independent, acoustically active cells mounted in the trim panel cavity wherein each acoustically active cell reduces sound pressure near the cell.

In one embodiment of the invention, each acoustically active cell includes an acoustical driver having an input receiving an electrical signal and a vibratable diaphragm providing an acoustic output signal according to the input. A housing supports the acoustical driver and makes the acoustical driver a source of sound pressure volume. An electroacoustical sensor separate from the acoustical driver transduces an acoustical pressure signal in the cavity to a corresponding transduced electrical signal. An amplifier has an input receiving the transduced electrical signal and an output providing an amplified signal to the input of the acoustical driver in an inverse feedback connection. The cell thus produces in the cavity a signal component tending to cancel the acoustical pressure signal in the cavity. The distance between the acoustical driver and the electroacoustical sensor is typically less than a distance between the plurality of acoustically active cells. The inverse feedback connection may be provided by a compensation circuit establishing an open loop gain having a maximum gain over a predetermined range of frequencies.

Another aspect of the invention is a process for attenuating noise in a cabin of an aircraft. The process involves transducing sound pressure in the vicinity of a sound pressure source in the cavity to provide an electrical signal. The electrical signal is inversely fed back to a driver of the sound pressure source.

These and other aspects, objects and advantages of the invention will be apparent from the following detailed description.

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
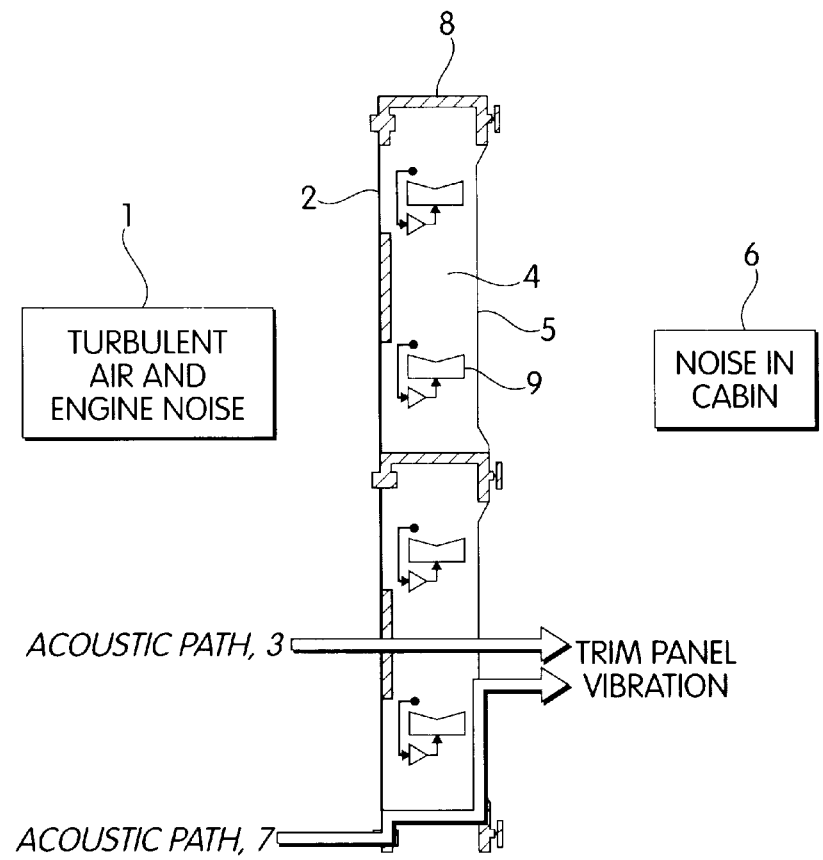
FIG. 1 is a schematic of the system of the selected application (trim panel activity) with the active sound absorbing cells schematically depicted by a microphone fed back through an amplifier into an acoustic driver.

Referring to FIG. 1, turbulent air and engine noise 1 exterior to the cabin cause the aluminum skin 2 of the fuselage to vibrate. The vibrating skin radiates sound pressure waves 3 through the trim panel cavity 4, exciting the trim panels 5, which in turn radiate sound pressure 6 into the cabin. The trim panels are also excited via vibrational paths 7 through the structural frames 8. Multiple sound absorbing acoustic cells 9 are placed in the trim panel cavity to decrease the acoustical impedance inside the trim panel cavity, which in turn reduces the transmission of noise into the cabin. Active acoustic cells 9 are schematically depicted in FIG. 1 by a microphone fed back through an amplifier into an acoustical driver. Each active cell may be mounted on the trim panel to the aluminum airframe structure, or it may be supported loosely by or incorporated into an insulation blanket in the trim panel cavity. In all of the various options, the cells are mounted in the trim panel cavity of the aircraft. The distance between the acoustical driver and the electroacoustical sensor should be less than the distance between the acoustically active cells.

Figure 2:
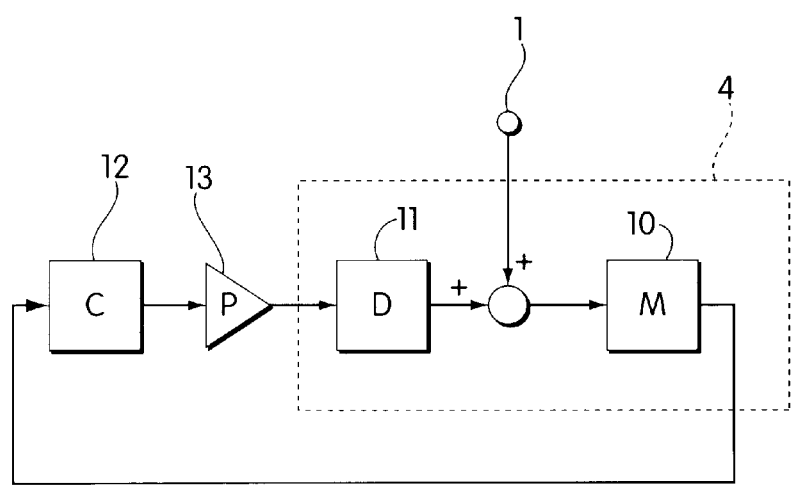
FIG. 2 is a block diagram representation of an individual active sound absorbing cell.

FIG. 2 is a block diagram illustrating the logical arrangement of an individual acoustic cell according to the invention. One or more electroacoustic sensors 10, such as a microphone, transduce the sound pressure in the trim panel cavity 4 in the vicinity of an acoustical driver 11, such as a speaker, into an electrical signal. An example microphone that may be used in this application is a Panasonic™ brand microphone, part number WM-160AY. An example speaker that may be used in this application is a NMB Technologies™ CF050005 speaker. Such a speaker has a vibratable diaphragm that is responsive to an input electrical signal. The sound pressure sensed by the sensor 10 is the combination of both noise from the turbulent air and engines 1 and sound from the acoustical driver 11, as illustrated schematically in FIG. 2. The sensor 10 provides a feedback signal which is filtered through a compensation circuit 12, which is designed to ensure that the open loop gain meets Nyquist stability criteria, so that the acoustic cell will not oscillate when the loop is closed. In particular, the compensation circuit should establish an open loop gain having a maximum gain over a predetermined range of frequencies, typically 100 Hz to 400 Hz. Typically, the compensation filter is a first-order low pass analog filter, although more complex compensation may be used. The output of the compensation circuit 12 is fed to a power amplifier 13, which energizes the acoustical driver 11. In this configuration, the acoustical driver 11 is energized so as to minimize the output of the microphone. In other words, the negative feedback from the sensor to the driver produces in the cavity an acoustic signal component tending to cancel the acoustical pressure signal in the cavity. The design of the active acoustic cells for a specific aircraft will depend on parameters of the specific aircraft.

Figure 3:
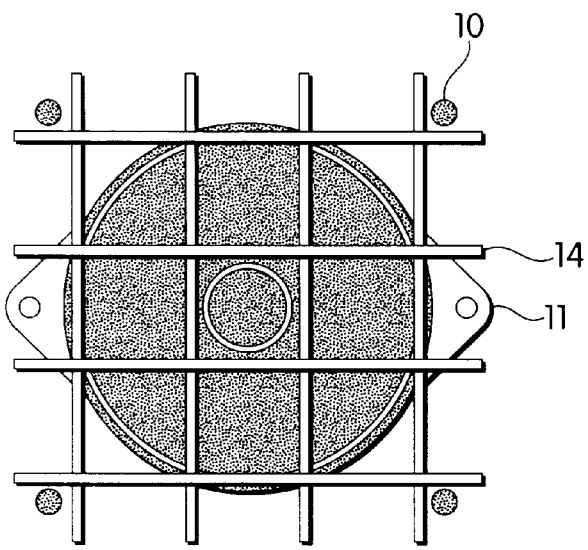
FIG. 3 is a diagrammatical top view of an individual active sound absorbing cell.

Referring to FIG. 3, a top schematic view of an individual active sound absorbing cell in one embodiment of the invention is shown. For clarity, electrical wiring is not shown. The acoustical driver 11 is shown with microphones 10 mounted on a grid 14, which protects a vibratable diaphragm of the acoustical driver 11. A typical cell may be roughly six centimeters (6 cm) in diameter and may wight about one hundred grams (100 g).

Figure 4:
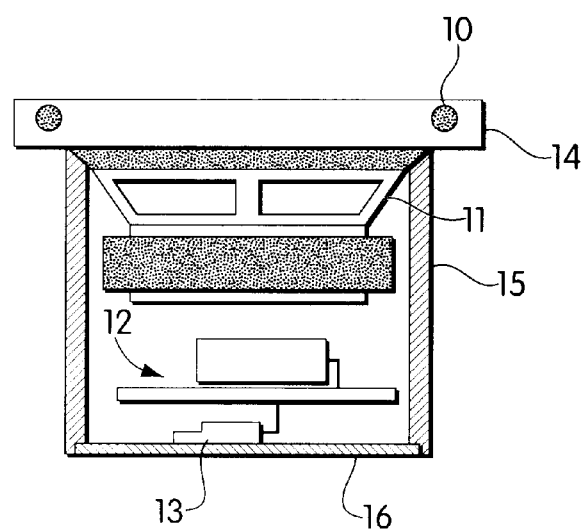
FIG. 4 is a side view of the cell of FIG. 3.

A cutaway side view of the cell is shown in FIG. 4. The back of the acoustical driver 11 is enclosed by a cylindrical enclosure 15, which may be made of a stiff, injection molded plastic, and a heat sink 16, which may be made of aluminum. This enclosure is stiff enough to make the acoustical driver 11, into an acoustic monopole, i.e., a volume source. In particular, the volume compliance of the enclosure is much less than the volume compliance of the enclosed air. The power amplifier 13 is mounted to the aluminum heat sink 16 and connected to compensator circuit board 12.

In operation, each cell transduces sound pressure in the vicinity of a sound pressure source in the cavity to provide an electrical signal. This electrical signal is inversely fed back to the driver of the sound pressure source. Multiple cells of this kind placed in the trim panel cavity decrease the acoustical impedance inside the trim panel cavity, which in turn reduces the transmission of noise into the cabin. This system eliminates the need for noise reduction devices to be placed in the cabin.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A system for attenuating noise in a cabin of an aircraft, the aircraft having an interior wall defining the cabin, and an exterior fuselage defining a trim panel cavity between the fuselage and the interior wall, the system comprising a plurality of acoustically active cells mounted in the trim panel cavity, and an electroacoustical sensor and an acoustical driver mounted within each cell, wherein a distance between the sensor and the driver is less than a distance between adjacent cells, and wherein the sensor transduces sound pressure in the cavity to produce an electrical signal which is inversely fed back to the driver to reduce sound pressure around the cell without a reference microphone.

2. The system of claim 1, wherein the acoustical driver has an input for receiving the electrical signal and a vibratable diaphragm providing an acoustic output signal according to the input;

wherein each acoustically active cell further comprises a housing supporting the acoustical driver and making the acoustical driver a source of acoustic volume;

an amplifier having an input for receiving the transduced electrical signal and an output for providing an amplified signal to the input of the acoustical driver in an inverse feedback connection, whereby the cell produces in the cavity a signal component tending to cancel the acoustical pressure signal in the cavity.

3. The system of claim 2, wherein a distance between the acoustical driver and the electroacoustical sensor is less than a distance between the plurality of acoustically active cells.

4. The system of claim 2, wherein the inverse feedback connection comprises:

a compensation circuit establishing an open loop gain having a maximum gain over a redetermined range of frequencies.

5. A system for attenuating noise in a cabin of an aircraft, the aircraft having an interior wall defining the cabin, and an exterior fuselage defining a trim panel cavity between the fuselage and the interior wall, the system comprising a plurality of acoustically active cells mounted in the trim panel cavity, wherein each acoustically active cell comprises:

means for transducing sound pressure in the vicinity of a driver of a sound pressure source in the cavity to provide an electrical signal; and means for inversely feeding back the electrical signal to the driver without a reference microphone;

wherein a distance between the means for transducing sound pressure and the driver is less than a distance between the adjacent acoustically active cells, and wherein each acoustically active cell reduces sound pressure around the cell.

6. A process for attenuating noise in a cabin of an aircraft, the aircraft having an interior wall defining the cabin, and an exterior fuselage defining a trim panel cavity between the fuselage and the interior wall, a plurality of acoustically active cells in the cavity, each cell having an electroacoustical sensor and an acoustical driver, a distance between the sensor and the driver being less than a distance between the adjacent cells, the process comprising the steps of:

for each of the cells transducing sound pressure with the sensor in the vicinity of the driver to provide an electrical signal; and for each of the cells inversely feeding back the electrical signal to the driver without a reference microphone.

* * * * *

UNITED STATES PATENT AND TRADEMARK OFFICE
CERTIFICATE OF CORRECTION

PATENT NO.      : 6,078,673                                                          Page 1 of 1
DATED           : June 20, 2003
INVENTOR(S)     : Andreas H. von Flotow, Mathieu Mercadal and Peter M. Tappert It is certified that error appears in the above-identified patent and that said Letters Patent is hereby corrected as shown below:

<u>Column 1,</u>
Line 4, after the Title and before Field of the Invention insert:
-- This invention was made with Government support under Contract Number FP-4662-430585 awarded by the Army Research Office. The Government has certain rights in this invention. --

Signed and Sealed this

Second Day of December, 2003

JAMES E. ROGAN
*Director of the United States Patent and Trademark Office*